(No Model.)
E. HUBER.
THRESHING MACHINE.
No. 576,270. Patented Feb. 2, 1897.
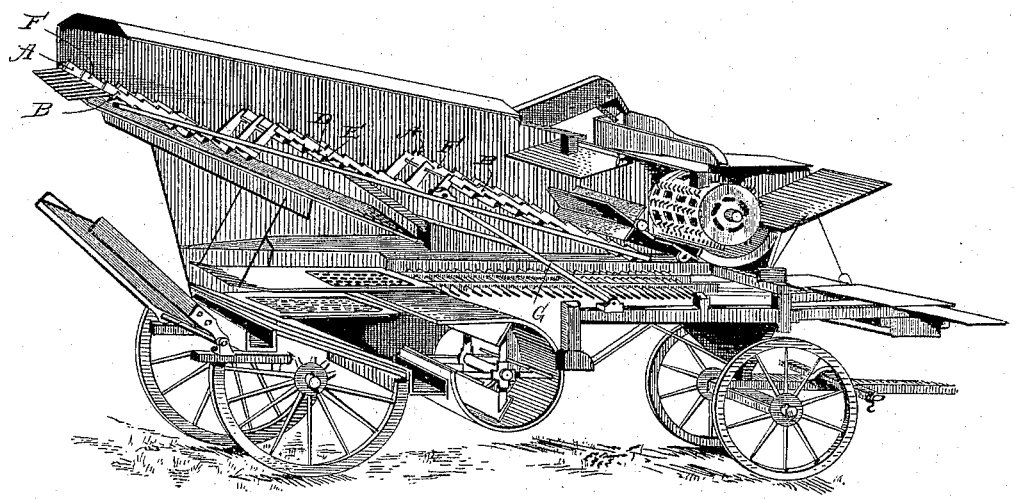
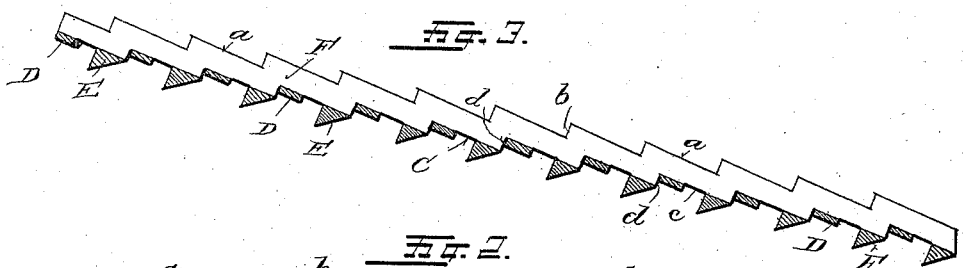
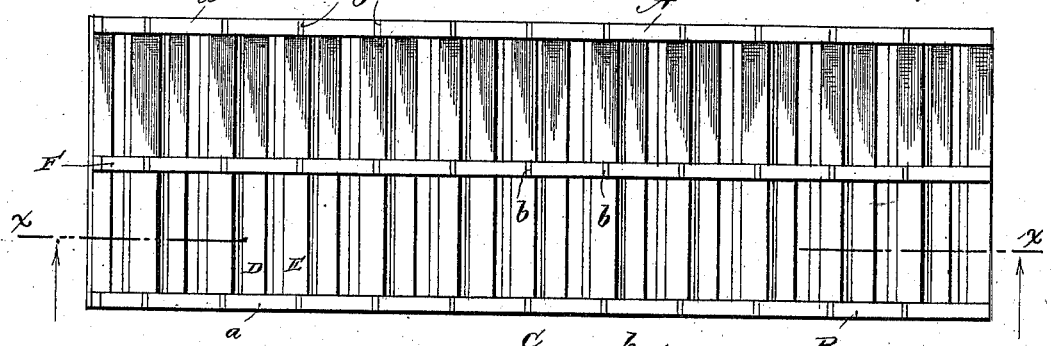
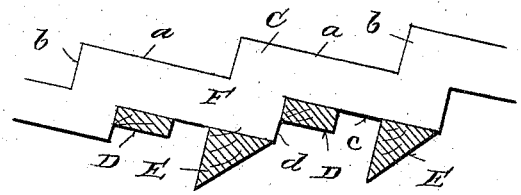
Witnesses
Jas. C. Dawley
H. M. McNair
Inventor,
Edward Huber,
By his Attorneys,
Toulmin & Whittemore.

United States Patent Office.

EDWARD HUBER, OF MARION, OHIO.

THRESHING-MACHINE.

SPECIFICATION forming part of Letters Patent No. 576,270, dated February 2, 1897.

Application filed April 2, 1896. Serial No. 585,853. (No model.)

*To all whom it may concern:*

Be it known that I, EDWARD HUBER, a citizen of the United States, residing at Marion, in the county of Marion and State of Ohio, have invented certain new and useful Improvements in Threshing-Machines, of which the following is a specification, reference being had therein to the accompanying drawings.

The invention relates, broadly, to threshing-machines, but more particularly to the novel construction of the separators which form a part of the same.

The object of the invention is to so construct this part of the thresher that, while being light and durable, it will, after separating the grain from the straw, effectively prevent the latter from falling through onto the grids beneath and expedite the discharge of the same.

To this end my invention consists of separating mechanism comprising one or more shakers provided on their lower edges with slats or bars constructed and arranged in a manner more fully hereinafter described.

The invention further consists in the peculiar construction, arrangement, and combination of the various parts, all as more fully hereinafter described, and shown in the accompanying drawings, in which—

Figure 1 is a perspective view of a thresher embodying my invention, one side of which is broken away to show the interior thereof. Fig. 2 is an enlarged detached plan view of the separator. Fig. 3 is a cross-section on line $xx$, Fig. 2; and Fig. 4 is a section similar to Fig. 3, enlarged to show the arrangement of the slats.

The principal portions of the machine, with the exception of my improved separator, do not differ from ordinary threshing-machines, comprising in general the wheeled frame carrying the chambered body in which is located the threshing-cylinder, its concave, the beater-blades, and the usual screens and fans.

Rearwardly of the cylinder is located the straw-shaker, suspended and adapted to be actuated in any suitable manner in the thresher and arranged and constructed in the following manner:

A and B are side bars or shakers provided on their upper edges with offsets or teeth C, having a rearward slant on their front edges forming the inclined faces $a$ and an abrupt fall in the rear forming the faces $b$. Upon the lower edges of these bars similar teeth are formed, comprising similarly-inclined and vertical faces $c$ and $d$, respectively, as plainly shown in Figs. 3 and 4. Secured to the lower inclined faces $c$ are cross-bars or slats D and E, which slats, connecting the side bars A and B, preferably arranged parallel, form the straw shaker or rack. The slats E are preferably, though not necessarily, of triangular shape, extending below slats D and spaced some distance apart from the latter to provide openings for the grain to drop through upon the screens beneath.

It has been customary heretofore in threshing-machines to provide each inclined face of the offsets upon the shaker-bars with a single ordinary slat, thus leaving a vertical opening between each successive slat or bar through which the grain is adapted to pass. Upon the oscillation of the shaker the tendency of the straw, especially upon the forward movement of the rack, is to be thrown backward, which results in having some of the straw pass through the grain-opening upon the screens beneath. This defect is overcome in the present device by the employment of downwardly-extending slats which form a series of stops that arrest the straw upon the oscillation of the shaker from being thrown backward between the slats upon the screens, and by arranging two or more slats upon each inclined face in the manner described discharge-openings are obtained which lessen the possibilities of the straw passing therethrough.

In the drawings I have shown, in connection with the side bars A and B, a central bar F, to which the slats may be secured in a similar manner, which is adapted to strengthen the frame of the shaker. It is also a preferable construction to form the shakers in three sections arranged as shown in Fig. 1, and to the sides of which are secured bars G, by means of which motion may be imparted to the separator. Although this is a preferable type for use I do not care to limit myself to the same, as various other arrangements of the separator may be made without departing from the spirit of my invention.

In operation the straw, after passing through the threshing-cylinder, is received upon the separator and discharged therefrom at the rear of the machine. The downwardly-projecting slats E come in contact with the straw, preventing the same from falling through the separator upon the screens below, and by the motion of the racks discharge the same from the machine.

Having thus described my invention, what I claim, and desire to secure by Letters Patent, is—

1. In a threshing-machine, the combination with two or more shaker-bars forming the sides of the separator-frame having a plurality of offsets or teeth upon their lower edges, and two series of slats or bars arranged upon the offsets, one of which series is adapted to project below the other to arrest the straw.

2. In a threshing-machine, the combination of two or more shaker-bars forming the sides of the separator-frame, having a plurality of offsets or teeth upon their lower edges, and two series of slats or bars arranged in pairs upon the inclined faces of the offsets or teeth, one of which series is adapted to extend below the other for the purposes described.

3. A grain-separating device for threshing-machines, comprising two or more shaker-bars, provided, upon their lower edges, with a plurality of offsets or teeth having inclined faces as described, cross-bars or slats in pairs, spaced from each other as described, arranged upon each inclined face, the lower bar of each pair extending below the spaces to form a stop for the straw, substantially as described.

In testimony whereof I affix my signature in presence of two witnesses.

EDWARD HUBER.

Witnesses:
JOHN J. CRAWLEY,
FRANK G. NORTON.